United States Patent [19]

Holik

[11] Patent Number: 4,560,474

[45] Date of Patent: Dec. 24, 1985

[54] FLOTATION APPARATUS FOR FLOATING FIBER SUSPENSIONS EXTRACTED FROM WASTE PAPER

[75] Inventor: Herbert Holik, Ravensburg, Fed. Rep. of Germany

[73] Assignee: Escher Wyss GmbH, Ravensburg, Fed. Rep. of Germany

[21] Appl. No.: 578,439

[22] Filed: Feb. 9, 1984

[30] Foreign Application Priority Data

Feb. 18, 1983 [CH] Switzerland .......................... 924/83

[51] Int. Cl.[4] ............................................... B01D 21/26

[52] U.S. Cl. ................................ 210/221.2; 209/170; 209/221; 210/512.1; 261/DIG. 75

[58] Field of Search .............................. 209/170, 211; 210/221.1, 221.2, 512.1; 162/4, 5, 336, 343; 261/DIG. 75, 79 A

[56] References Cited

U.S. PATENT DOCUMENTS 4,347,128 8/1982 Barnscheide .................... 210/221.2

4,514,259 4/1985 Koski ................................ 162/343

FOREIGN PATENT DOCUMENTS 275365 8/1964 Australia ......................... 210/221.2

2364181 5/1978 France ............................ 210/221.2

*Primary Examiner*—Richard V. Fisher

*Assistant Examiner*—W. Gary Jones

*Attorney, Agent, or Firm*—Werner W. Kleeman

[57] ABSTRACT

The flotation apparatus has a vessel or container into which vortex or turbulence channels lead. These vortex channels supply the fiber suspension or stock to the vessel and are provided with at least one stepped enlargement. An air conduit supplying flotation air opens into the vortex channel. The vessel is substantially cylindrical about a vertical axis and is provided in its upper region with a central conduit or pipe for extracting the flotation foam. In the lower region of the vessel a conduit for extracting the recovered good stock is disposed tangentially.

7 Claims, 3 Drawing Figures

FLOTATION APPARATUS FOR FLOATING FIBER SUSPENSIONS EXTRACTED FROM WASTE PAPER

BACKGROUND OF THE INVENTION

The present invention broadly relates to a flotation apparatus and, more specifically, pertains to a new and improved construction of a flotation apparatus for the flotation of fiber suspensions or fiber stock recovered from waste paper.

Generally speaking, the flotation apparatus of the present invention is of the type comprising a vessel or container provided with a delivery or infeed device for delivering and simultaneously aerating a fiber suspension to be floated or separated and with an outlet for good stock and a further outlet for flotation foam.

Flotation devices of this type serve for the separation of impurities, such as detached printing ink, from the fiber suspension or stock. These impurities accumulate in the flotation foam formed by the delivery of finely distributed air.

It is difficult to accomplish this fine distribution of air in the fiber suspension or fiber stock which is necessary to effect the desired mixing. Means heretofore employed for this purpose, whether permeable walls, rotating aeration heads with air jets or injector devices, all have various disadvantages and are not optimally effective in the distribution of the air.

SUMMARY OF THE INVENTION

Therefore, with the foregoing in mind, it is a primary object of the present invention to provide a new and improved construction of a flotation apparatus which does not have associated with it the aforementioned drawbacks and shortcomings of the prior art constructions.

Another and more specific object of the present invention aims at providing a new and improved construction of a flotation apparatus of the previously mentioned type which provides an especially fine distribution of the air in the fluid material or stock suspension while simultaneously producing a more intensive separation process and an increase in separation sensitivity.

Yet a further significant object of the present invention aims at providing a new and improved construction of a flotation apparatus of the character described which is relatively simple in construction and design, extremely economical to manufacture, highly reliable in operation, not readily subject to breakdown or malfunction and requires a minimum of maintenance and servicing.

Now in order to implement these and still further objects of the invention, which will become more readily apparent as the description proceeds, the flotation apparatus of the present invention is manifested by the features that its delivery device or means comprise at least one vortex or turbulence channel leading to the vessel, this vortex channel being provided with at least one stepped enlargement or widened portion of the stepped diffusor type as well as with at least one air conduit or line for the delivery of flotation air opening into the vortex channel.

The flotation apparatus according to the invention accomplishes these objectives by providing the delivery device or means with at least one vortex or turbulence channel leading into the vessel or container. The vortex channel has at least one stepped enlargement or widened portion of the stepped diffusor type. An air conduit or line for the supply of flotation air opens into the vortex channel.

In channels having stepped enlargements or widened portions, very intensive microturbulence arises in the region of the enlargement or widened portion This microturbulence results in a fine distribution of the supplied air and in an intensive admixing of the air with the fiber suspension or stock. The air mixes especially intensively with the finer particles of the fiber suspension.

The most intensive mixing of the air with the fiber suspension or stock is achieved when the air conduit or line opens into the vortex or turbulence channel in the region of its stepped enlargement or widened portion. The air conduit may open into the vortex channel either before or after the enlargement.

A progressively narrower or tapering nozzle channel may follow the vortex channel with its stepped enlargement. The resulting reduction of the cross-section produces an acceleration of the delivered stream of turbulent fiber suspension or stock which is advantageous for the separation of the foam.

This arrangement is particularly practical when the vortex channel with its stepped enlargement is arranged to be tangential to the circumference of the rotationally symmetrical vessel or container. In this manner, a turbulent flow is produced in which the separation of the foam occurs under the influence of centrifugal force rather than gravity.

The vessel preferably comprises a substantially cylindrical portion having a substantially vertical axis. The delivery device as well as means for extracting the flotation foam are preferably disposed in the upper region of the cylindrical portion of the vessel. Further means for the extraction of the recuperated material or good stock are preferably arranged in the lower region of the cylindrical portion of the vessel. A particularly simple construction of the vessel or container is obtained by these measures.

The means for extracting the good stock can comprise a tubular conduit or pipe extending in the direction of flow tangential to the circumference of the vessel. In such an arrangement of the tubular conduit or pipe, the outflow of the recuperated material takes place with minimum losses, which is advantageous for the functioning of the flotation apparatus.

The means for extracting the flotation foam can comprise a vertical conduit or pipe extending along the vertical axis of the vessel. In this way, the extraction of the flotation foam formed in the core of the turbulent vortex can be optimally effected.

The top of the vessel or container can be structured to be open in at least a central region thereof. The tubular conduit for the extraction of the flotation foam enters the vessel through this opening. In this case, the vessel operates at atmospheric pressure, normally requiring the provision of means or some facility for extracting or suctioning the flotation foam.

It is also possible to structure the device such that the vessel is closed at the top and the entry of the tubular conduit is sealed. In this case, the vessel may be operated at a pressure above atmospheric. This overpressure causes the flotation foam to flow out of the vessel.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
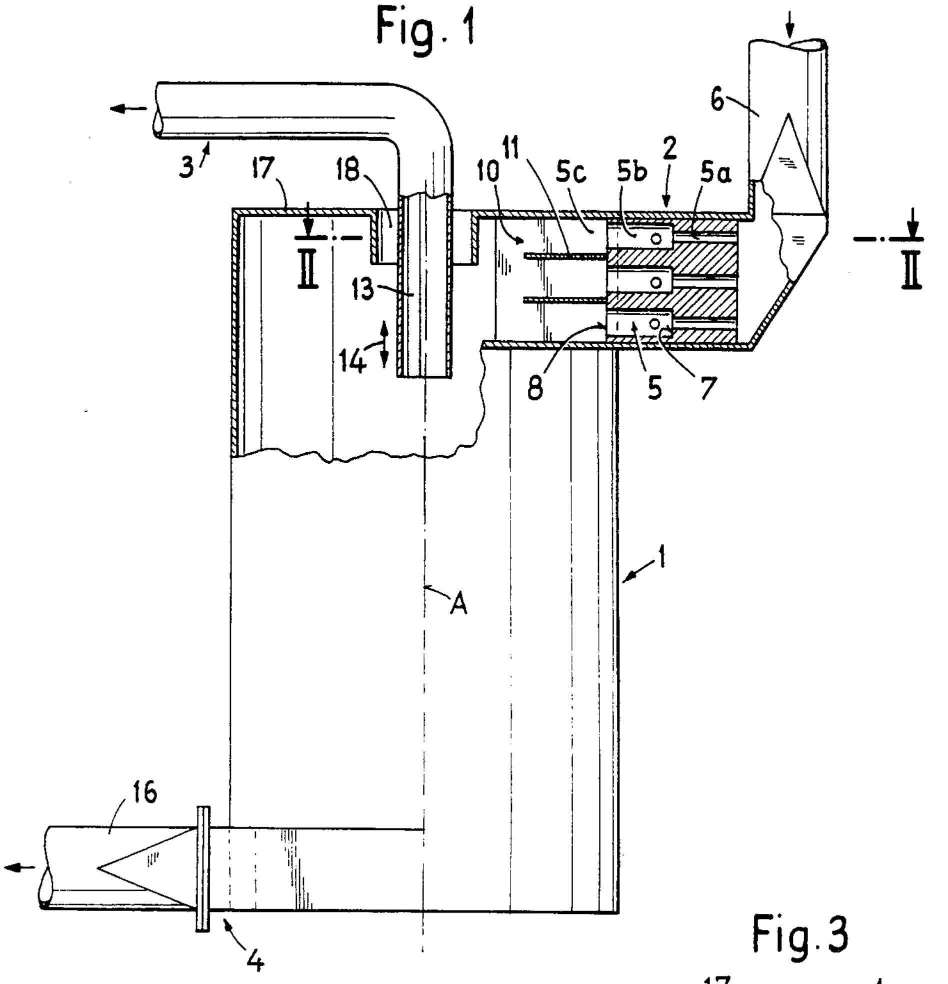
FIG. 1 is a schematic representation of the flotation apparatus according to the invention seen in side view and partial section taken substantially along the line I—I of FIG. 2.

Describing now the drawings, the flotation apparatus depicted in FIG. 1 comprises a vessel or container 1 having a substantially cylindrical spatial configuration and a substantially vertical axis A of rotational symmetry. In the upper region of the vessel or container 1 there is a delivery device or means 2 as well as an arrangement 3 for the extraction of the flotation foam. In the lower region of the vessel 1 there is an arrangement or means 4 for the extraction of the recuperated material or good stock.

The delivery or supply device 2 for the supply of the fiber suspension or stock comprises vortex or turbulence channels 5 leading to the vessel 1 which, according to FIG. 1, are disposed parallel to one another and are connected to a delivery or supply conduit 6. The vortex channels 5 are each provided with a stepped enlargement or widened portion 7 formed between two substantially cylindrical channel segments or sections *5a* and *5b*. At the end of the channel segment or section *5b* there is a further stepped enlargement or widened portion 8 which opens into a nozzle channel 10 having a progressively narrowing or tapering rectangular cross-section. The nozzle channel 10 is subdivided by plate-shaped partition panels or walls 11 to form subchannels or subpassages *5c*. The subchannels *5c* form a continuation of the vortex channels 5.

Figure 2:
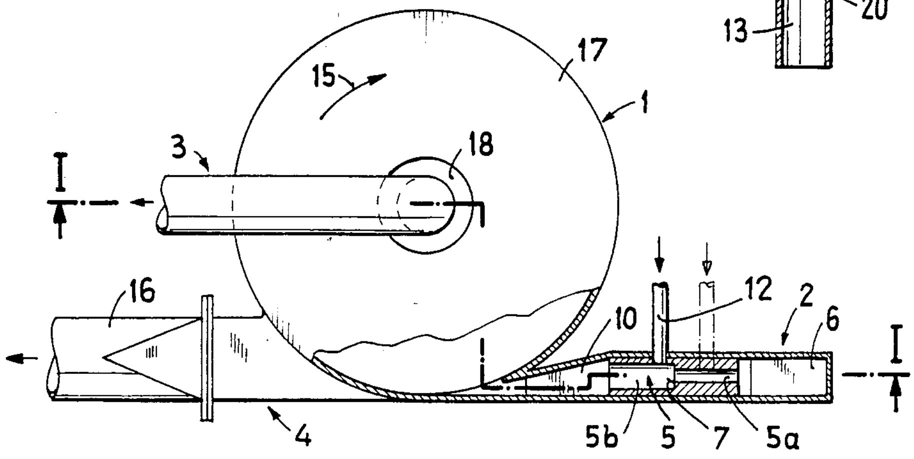
FIG. 2 shows a schematic plan view of the flotation device taken substantially along the line II—II of FIG. 1.

As can be particularly well seen in FIG. 2, each vortex channel 5 is arranged substantially tangential to the circumference of the cylindrical vessel or container 1. The connection of the air conduits 12 to the vortex channels 5 can also be seen in FIG. 2. These air conduits or lines 12 open in the vicinity of the stepped enlargement or widened portion 7 in the related vortex channel 5 and, according to FIG. 2, in the channel segment or section *5b*. As indicated in broken or phantom lines in FIG. 2, the connection of the air conduits or lines 12 can alternatively be made at the channel segment or section *5a*.

The arrangement or means 3 for the extraction of flotation foam or the like comprises a substantially vertical tubular conduit or pipe 13 arranged on the vertical axis A of the vessel 1. This tubular conduit 13 is appropriately adjustable in the vertical direction as generally indicated by the double-headed arrow 14 in FIG. 1.

The arrangement or means 4 for the extraction of the recuperated material or good stock comprises a tubular conduit or pipe 16 arranged tangentially to the vessel 1 and extending in the direction of flow indicated by the arrow 15 in FIG. 2.

As can be best seen in Figure or container 1, the vessel 1 is open at the top in its central region. The top or upper cover 17 of the vessel 1 is provided with an opening or aperture 18 for this purpose. The tubular conduit 13 for the extraction of the flotation foam enters the vessel 1 through this opening 18.

Figure 3:
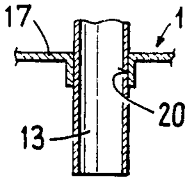
FIG. 3 shows a detailed view of an alternative embodiment to that of FIG. 1.

In the modified embodiment shown in FIG. 3, the top or upper cover 17 of the vessel 1 is provided with a smaller opening 20 which sealingly engages the tubular conduit 13 as it enters. In this case the vessel 1 is closed at the top.

It will be understood that the vortex or turbulence channels 5 can be provided with a plurality of stepped enlargements or widened portions 7, preferably two stepped enlargements or widened portions, instead of only a single stepped enlargement 7. Under certain circumstances the partitioning panels or walls 11 may also be omitted.

While there are shown and described present preferred embodiments of the invention, it is to be distinctly understood that the invention is not limited thereto, but may be otherwise variously embodied and practiced within the scope of the following claims.

Accordingly, what I claim is:

1. A flotation apparatus for floating fiber suspensions obtained from waste paper, comprising:

a vessel defining a substantially rotationally symmetrical container having a circumference;

delivery means provided for said vessel for delivery and simultaneously aerating a fiber suspension to be floated;

said container having a substantially vertical axis;

said container including an upper region and a lower region;

said delivery means being disposed in said upper region of said container;

said delivery means comprising at least one vortex channel leading to said container;

said at least one vortex channel being provided with at least one stepped enlargement;

said stepped enlargement comprising at least two channel segments separated by a widened portion for inducing intensive microturbulence in fiber suspensions passed therethrough;

said at least one vortex channel having a predetermined region situated between its ends and comprising the widened portion separating said at least two channel segments of said stepped enlargement;

at least one air conduit for the delivery of flotation air opening into said at least one vortex channel in said predetermined region;

means defining a progressively tapering nozzle channel located downstream of said at least one vortex channel and disposed in tangential relationship to said circumference of said container;

said container being provided with an outlet for good stock and a further substantially vertically adjustable outlet for flotation foam;

said outlet for good stock comprising first extraction means for extracting the good stock disposed in said lower region of said container; and said further substantially vertically adjustable outlet for flotation foam comprising a substantially vertically adjustable second extraction means for extracting the flotation foam and arranged in said upper region of said container.

2. The flotation apparatus as defined in claim 1, wherein:

said container comprises a substantially cylindrical portion having said substantially vertical axis; and said substantially cylindrical portion includes said upper region and said lower region.

3. The flotation apparatus as defined in claim 2, wherein:

said first extraction means comprises a first tubular conduit extending in substantially tangential relationship to said circumference of said container.

4. The flotation apparatus as defined in claim 2, wherein:

said second extraction means comprises a second tubular conduit extending substantially vertically along said substantially vertical axis of said substantially cylindrical portion of said container.

5. The flotation apparatus as defined in claim 4, wherein:

said container is provided with an opening at least at a central region of said upper region of said substantially cylindrical portion of said container; and said second tubular conduit entering tne container through said opening.

6. The flotation apparatus as defined in claim 4, wherein:

said container is closed at its upper region; and said second tubular conduit sealingly entering the container at its said upper region of said substantially cylindrical portion.

7. A flotation apparatus for the flotation of a fiber stock suspension reclaimed from waste paper, comprising:

a vessel having a substantially cylindrical portion, an outer wall and a substantially vertical axis of rotational symmetry;

said outer wall having an inner side defining immediately adjacent thereto an upper circumferential region and a lower circumferential region of said substantially cylindrical portion;

delivery means for delivering to said vessel and for simultaneously aerating a fiber stock suspension to be subjected to flotation;

said delivery means comprising at least one nozzle channel leading into said vessel at said upper circumferential region of said cylindrical portion in substantially tangential relationship to said inner side of said outer wall for inducing rotary circulation of the fiber stock suspension delivered into said vessel in a predetermined direction of rotation within said vessel such that a centrifugal force is generated in the fiber stock suspension which contributes to flotation;

said delivery means further comprising at least one vortex channel leading to said at least one nozzle channel;

said at least one vortex channel comprising a substantially cylindrical first channel segment having a predetermined first diameter opening into said at least one nozzle channel and at least one substantially cylindrical further channel segment having a predetermined further diameter less than said predetermined first diameter and opening into said first channel segment to define a stepped enlargement for inducing microturbulence in the fiber stock suspension being delivered into said vessel;

at least one air conduit for delivering flotation air and opening into said at least one vortex channel near to said stepped enlargement;

first extraction means for extracting good stock opening out of said vessel at said lower circumferential region of said substantially cylindrical portion in substantially tangential relationship to said inner side of said outer wall and in said direction of rotation within said vessel of the fiber stock suspension;

said substantially vertical axis of rotational symmetry having an upper end defining an upper central region of said vessel;

second substantially vertically adjustable extraction means for extracting flotation foam extending substantially vertically along said substantially vertical axis of rotational symmetry in said upper central region;

said at least one nozzle channel progressively narrowing from said at least one vortex channel toward said vessel for accelerating the fiber stock suspension being delivered into said vessel and thereby augmenting said rotary circulation such that a free upper surface of the fiber stock suspension within said vessel rises in said upper circumferential region and falls in said upper central region to produce a substantially concave configuration of the free upper surface; and said substantially vertically adjustable second extraction means being selectively positionable along said substantially vertical axis of rotational symmetry in said upper central region for adapting said second extraction means to a level of the free upper surface of the fiber stock suspension in said upper central region as defined by said substantially concave configuration.

* * * * *